April 25, 1933.   H. DENSTÄDT ET AL   1,906,139
MACHINE FOR SETTING ROWS OF PLANTS DEEPER
Original Filed March 15, 1929
Fig.1.
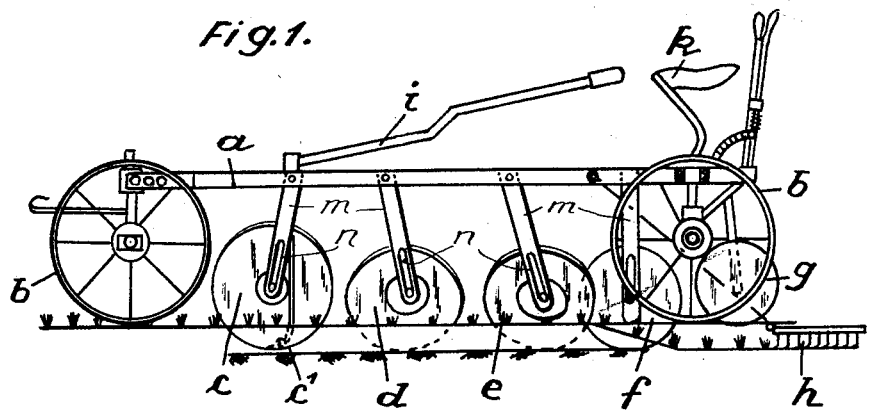
Fig.2.
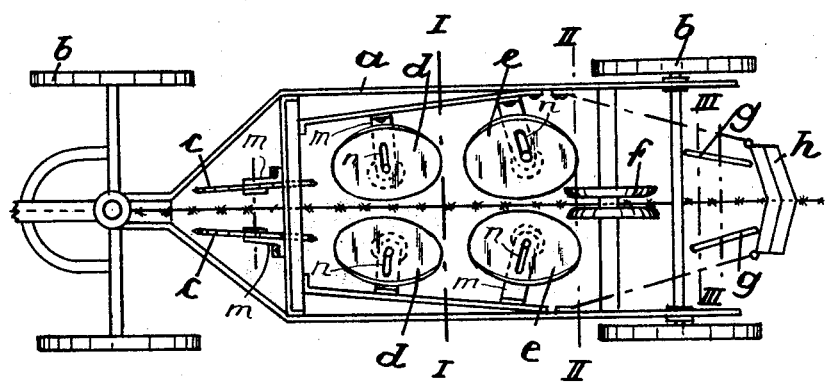
Fig.3.   Fig.4.   Fig.5.   Fig.6.
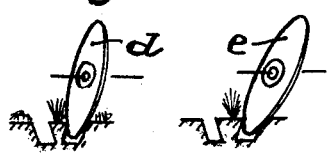 
Witnesses:   Inventors:
Hermann Denstädt.

Patented Apr. 25, 1933

1,906,139

UNITED STATES PATENT OFFICE

HERMANN DENSTÄDT, FRIEDRICH DENSTÄDT, AND MAX WEICHERT, OF NEUBRANDENBURG, GERMANY

MACHINE FOR SETTING ROWS OF PLANTS DEEPER

Application filed March 15, 1929, Serial No. 347,376, and in Germany October 9, 1928. Renewed November 19, 1932.

The present invention relates to a machine for promoting the growth of drill seeds, particularly corn, by setting the rows of the plants deeper into the ground, so that the root-stock, which is located above the ground, will be removed or forced into the soil.

This deep planting of the stock has first the purpose to promote the growth of roots and stalks and to take away the root-stocks from the surface where they are subject to the changing temperatures to a high extent, so that they may embed suckers deep under the soil, where they will find moisture and nourishment even in dry periods. In this way, the soil will be utilized to a much higher degree than heretofore.

The action of deep replanting brings out excellent results also for the following reason: In the growing of the plant, there is a short interruption of augmentation, in consequence of which an increased growth takes place of the seed at the expense of the stalks.

Every unnecessary action of the earth directly beneath the plants must be avoided, since the frost, for instance, may lift up the earth and the plants may lose their entire contact with the ground and may, therefore, freeze, causing the plants to perish.

The present invention will avoid the foregoing, as the drill seed plants are sent down into the soil by excavating the soil below the plants by special formed ploughshares or discs, which do not move the plants in any way to one side but dig a ditch on both sides and set down the plants perpendicularly on their exact locations.

The soil directly below the plants rests firm and solid; the root-stock with the earth ball is lowered as an entirety and covered carefully with soil, therewith fulfilling all requirements of the best art in transplanting cornseed.

Other objects and details will be more fully disclosed hereafter, reference being taken to the accompanying drawing in which:

Figure 1 is a side elevation;

Fig. 2 is a top view of the deep-setting plant machine;

Fig. 3 is a sectional elevation taken on the line I—I of Fig. 2;

Fig. 4 is a section on line II—II of Fig. 2;

Fig. 5 is a section on line III—III of Fig. 2; and

Fig. 6 is a section through the working ground after it has been smoothed over by a harrow.

The frame $a$ of the carriage is supported by four wheels $b$ and may be drawn along the drill rows by animal power or in any suitable manner. At the front of the machine, a pair of perpendicularly-arranged discs $c$ are provided, which cut the soil at a desired distance on both sides of the plant and at the same time are movable by means of handle $i$ to steer the machine. As shown in Fig. 1, the handle $i$ may be merely connected to the front brackets $m$ of discs $c$, which may be loosely mounted so that a slight shifting of the discs will provide the necessary steering in connection with the row to be followed. A second pair of discs $d$, inclined somewhat from the vertical, excavate the soil on both sides of the row to a certain depth. A third pair of discs $e$, inclined to a greater extent than discs $d$, bring, almost entirely, out or force the soil from the rootballs to thus dig a trench on each side of the row. The press wheels $f$, following discs $e$, are adjustably set together from two discs and are preferably made of cast steel and provided with an outwardly bent edge, which will roll the soil together with the plants into the excavation or trench.

The soil which was excavated by the discs $d$ and $e$ is now shoved back to the middle by a pair of vertical bevel wheels $g$. Thereafter the surface of the soil may be made smooth by a harrow $h$, which is provided on the rear portion of the carriage.

The first pair of discs $c$ is mounted on the frame $a$ in such a way that it can be exactly steered on both sides of the drill row. For that purpose, a handle bar $i$ extends so far back that it can easily be attended by the operator seated on seat $k$ of the deep-setting plant machine.

On each side of the discs $c$ are placed raking hooks $c^1$, which operate on the soil at the side of the discs for the following discs and thereby assist them in the excavation of the trench.

The discs c, d, e and f are suitably mounted on brackets or standards m, each of which may be provided with a slot n for the purpose of adjusting the disc in its bracket to thereby regulate the depth of the trench which it is desired to dig. Any suitable adjusting device, not shown, or even merely bolts and nuts may be provided to lock the discs in adjusted position.

We claim as our invention:—

1. A deep-setting plant machine for rows of plants, comprising a frame; wheels for the frame; a plurality of discs mounted on the frame for digging a trench on each side of a row of plants and thereunder; means on the frame for setting the plants into the trenches; and means on the frame for smoothing the soil over the deep-set plants.

2. A deep-setting plant machine for rows of plants, comprising a frame; wheels for the frame; a plurality of pairs of discs mounted on the frame for digging a trench on each side of a row of plants; a press wheel on the frame for setting the plants into the trenches; and means on the frame for smoothing the soil over the deep-set plants.

3. A deep-setting plant machine for rows of plants, comprising a frame; wheels for the frame; a plurality of pairs of discs mounted on the frame for digging a trench on each side of a row of plants; a press wheel on the frame for setting the plants into the trenches; and a pair of bevel wheels and a harrow at the rear end of the frame for smoothing the soil over the deep-set plants.

4. A deep-setting plant machine for rows of plants, comprising a frame; wheels for the frame; three pairs of discs mounted on the frame, the foremost pair being vertically mounted on the frame to cut the soil on each side of the row of plants and the second and third pairs of discs being angularly mounted on the frame and adapted to dig a trench on each side of the row; a press wheel on the frame for setting the plants into the trenches; and means for smoothing the soil over the deep-set plants.

5. A deep-setting plant machine for rows of plants, comprising a frame; wheels for the frame; three pairs of discs mounted on the frame, the foremost pair being vertically mounted on the frame to cut the soil on each side of the row of plants and the second and third pairs of discs being angularly mounted on the frame and adapted to dig a trench on each side of the row, said third pair of discs being at a greater angle than the second set; a press wheel on the frame for setting the plants into the trenches; and means for smoothing the soil over the deep-set plants.

6. A deep-setting plant machine for rows of plants, comprising a frame; wheels for the frame; three pairs of discs mounted on the frame, the foremost pair being vertically mounted on the frame to cut the soil on each side of the row of plants and the second and third pairs of discs being angularly mounted on the frame and adapted to dig a trench on each side of the row, said first pair of discs being movable to steer the machine; a press wheel on the frame for setting the plants into the trenches; and means for smoothing the soil over the deep-set plants.

7. A deep-setting plant machine for rows of plants, comprising a frame; wheels for the frame; three pairs of discs mounted on the frame, the foremost pair being vertically mounted on the frame to cut the soil on each side of the row of plants and the second and third pairs of discs being angularly mounted on the frame and adapted to dig a trench on each side of the row, said third pair of discs being at a greater angle than the second set; a press wheel on the frame for setting the plants into the trenches; means for smoothing the soil over the deep-set plants; and a raking hook on each side of the first pair of discs.

In testimony whereof we affix our signatures.

HERMANN DENSTÄDT.
FRIEDRICH DENSTÄDT.
MAX WEICHERT.